United States Patent
Oh et al.

(10) Patent No.: US 10,734,695 B2
(45) Date of Patent: Aug. 4, 2020

(54) LITHIUM AIR BATTERY AND MANUFACTURING METHOD THEREOF

(71) Applicants: Hyundai Motor Company, Seoul (KR); KIA Motors Corporation, Seoul (KR)

(72) Inventors: Gwang Seok Oh, Seoul (KR); Jong Chan Song, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/209,238

(22) Filed: Dec. 4, 2018

(65) Prior Publication Data

US 2020/0119419 A1    Apr. 16, 2020

(30) Foreign Application Priority Data

Oct. 11, 2018    (KR) .................. 10-2018-0120810

(51) Int. Cl.
*H01M 6/16*    (2006.01)
*H01M 12/06*    (2006.01)
*H01M 4/38*    (2006.01)
*H01M 4/583*    (2010.01)

(52) U.S. Cl.
CPC ........... *H01M 12/06* (2013.01); *H01M 4/382* (2013.01); *H01M 4/583* (2013.01)

(58) Field of Classification Search
CPC ....... H01M 12/06; H01M 4/382; H01M 4/583
See application file for complete search history.

(56) References Cited

U.S. PATENT DOCUMENTS

| 2010/0214040 A1 | 8/2010 | Kaneda et al. |
| 2012/0214040 A1 | 8/2012 | Tsutsumi et al. |
| 2017/0033370 A1* | 2/2017 | Duan .................... H01M 12/08 |

FOREIGN PATENT DOCUMENTS

EP    3 300 165 A1    3/2018

OTHER PUBLICATIONS

Black, Robert et al., "Screening for Superoxide Reactivity in Li—$O_2$ Batteries: Effect on $Li_2$—$O_2$/LiOH Crystallization," J.Am. Chem.Soc., 2012, 134, pp. 2902-2905.

* cited by examiner

*Primary Examiner* — Jane J Rhee
(74) *Attorney, Agent, or Firm* — Brinks Gilson & Lione

(57) ABSTRACT

The present disclosure relates to a lithium air battery and a manufacturing method thereof. A seed layer for inducing the growth of thin-film type discharge products is formed on a carbon positive electrode. The number of reaction regions that can react with lithium ions is increased, whereby high-speed discharging is possible. Since the seed layer induces the growth of the thin-film type discharge products, high-speed charging is also possible. In addition, since the seed layer induces the growth of the thin-film type discharge products, it is possible to increase the capacity of the battery. Furthermore, the occurrence of overvoltage in the lithium air battery is reduced, whereby the lifespan of the battery is increased while the stability of the battery is improved.

17 Claims, 23 Drawing Sheets

(a)  (b)

[ The prior art ]

LITHIUM AIR BATTERY AND MANUFACTURING METHOD THEREOF

CROSS-REFERENCE TO RELATED APPLICATION

This application claims priority to and the benefit of Korean Patent Application No. 10-2018-0120810, filed on Oct. 11, 2018, which is incorporated herein by reference in its entirety.

FIELD

The present disclosure relates to a lithium air battery including an negative electrode capable of storing and discharging, and a positive electrode using oxygen in the air.

BACKGROUND

The statements in this section merely provide background information related to the present disclosure and may not constitute prior art.

A lithium air battery generally includes a negative electrode capable of storing and discharging lithium ions, and a positive electrode using oxygen in the air as a positive electrode active material. The positive electrode includes an oxygen evolution and reduction catalyst, and an electrolyte disposed between the negative electrode and the positive electrode. The lithium air battery has very high energy density, since oxygen in the air is used as the positive electrode active material, whereby the lithium air battery has attracted considerable attention as the next-generation battery.

When the lithium air battery is discharged, lithium generated from the negative electrode is coupled to oxygen for generating a lithium oxide in positive electrode, and the oxygen is reduced (oxygen reduction reaction: ORR) to generate oxygen negative ions. On the other hand, when the lithium air battery is charged, the lithium oxide is oxidized, and the oxygen is evolved (oxygen evolution reaction: OER) to generate oxygen.

In particular, we have discovered that the lithium oxide formed during the discharging of the lithium air battery is not sufficiently dissolved in an organic solvent, and thus exists as a solid oxide. In this case, the solid-state lithium oxide accumulates in a reaction site of the positive electrode, which is a carbon electrode, to block an oxygen channel, whereby the diffusion of oxygen is impeded. That is, the solid-state lithium oxide impedes contact between oxygen and lithium ions, and blocks pores in carbon. Accordingly, it is difficult to form a lithium oxide, whereby the capacity of the battery is reduced. In addition, some lithium oxide that have not been reduced during the charging of the battery are existed as a side-reaction deposit, which impedes the transmission of an electric charge, whereby high resistance and high voltage are caused. Accordingly, the battery may be deteriorated due to the decomposition of the electrolyte.

The above information disclosed in this Background section is only for enhancement of understanding of the background of the disclosure, and therefore it may contain information that does not form the prior art that is already known to a person of ordinary skill in the art.

SUMMARY

The present disclosure provides a lithium air battery including a seed layer formed between a carbon positive electrode and a separator such that high-speed charging and discharging are possible, whereby the capacity of the battery is increased.

In addition, the present disclosure provides a manufacturing method of a lithium air battery by which a seed layer formed on a carbon positive electrode induces the growth of thin-film type discharge products to inhibit the occurrence of overvoltage, whereby the lifespan of the battery is increased while the stability of the battery is improved.

According to an aspect of the present disclosure, the present disclosure provides a lithium air battery having a separator, a lithium negative electrode and an electrolyte includes a carbon positive electrode, a seed layer formed on the carbon positive electrode, the separator formed on the seed layer, the lithium negative electrode formed on the separator, and the electrolyte impregnated in the separator. The seed layer includes a non-metal element including lithium (Li), a lithium-based compound, or a mixture thereof.

The seed layer may include at least one non-metal element selected from the group consisting of lithium (Li), carbon (C), oxygen (O), nitrogen (N), phosphorus (P), and sulfur (S), the lithium-based compound, to which at least one non-metal element selected from the group consisting of lithium (Li), carbon (C), oxygen (O), nitrogen (N), phosphorus (P), and sulfur (S) is coupled, or the mixture thereof.

The lithium-based compound may be at least one selected from the group consisting of $LiNO_3$, $LiNO_2$, $Li_2S_6$, $Li_3P$, $Li_3PO_4$, $Li_xPO_yN_z$ (where $3<x<4.5$, $1.5<y<3.5$, and $0.2<z<1.5$), $Li_2CO_3$ or mixtures thereof.

According to a further aspect of the present disclosure, the seed layer may have a thickness of 1 to 100 nm. The seed layer may exhibit lithium ion conductivity higher than electron conductivity. The lithium air battery may be repeatedly charged and discharged to induce the growth of thin-film type discharge products between the seed layer and the separator. The thin-film type discharge products may be at least one lithium oxide selected from the group consisting of $Li_2O_2$, $LiO_2$, and $LiOH$.

According to another aspect of the present disclosure, the present disclosure provides a manufacturing method of a lithium air battery having a separator, a lithium negative electrode and an electrolyte. The manufacturing method includes the steps of mixing a carbon positive electrode with a composition for seed formation, forming a seed layer on the carbon positive electrode, and manufacturing the lithium air battery including the carbon positive electrode having the seed layer thereon, the lithium negative electrode, the separator disposed between the carbon positive electrode having the seed layer thereon and the lithium negative electrode, and the electrolyte impregnated in the separator. The seed layer includes a non-metal element including lithium (Li), a lithium-based compound, or a mixture thereof.

According to a further aspect of the present disclosure, the composition for seed formation may include a lithium-based compound and an organic solvent. The composition for seed formation may include a lithium-based compound having a concentration of 0.1 to 5M. The organic solvent may be at least one selected from the group consisting of dimethylacetamide (DMAc), N-methylformamide, N-methylpyrrolidone, and diethylacetamide.

According to a further aspect of the present disclosure, the seed layer may include at least one non-metal element selected from the group consisting of lithium (Li), carbon (C), oxygen (O), nitrogen (N), phosphorus (P), and sulfur (S), the lithium-based compound, to which at least one non-metal element selected from the group consisting of lithium (Li), carbon (C), oxygen (O), nitrogen (N), phosphorus (P), and sulfur (S) is coupled, or the mixture thereof.

The lithium-based compound may be at least one selected from the group consisting of LiNO3, LiNO2, Li2S6, Li3P, Li3PO4, LixPOyNz (where $3<x<4.5$, $1.5<y<3.5$, and $0.2<z<1.5$), Li2CO3 or mixtures thereof.

The step of forming the seed layer may include supplying current to the composition for seed formation, with which the carbon positive electrode is mixed, for 10 minutes to 10 hours under conditions of a pressure of 1 to 3 bar, a current of 0.1 to 0.9 mA/cm2, and a voltage of 2.0 to 4.6 V in order to perform electrolysis.

The manufacturing method may further include repeatedly charging and discharging the lithium air battery to induce the growth of thin-film type discharge products between the seed layer and the separator.

The step of inducing the growth of the thin-film type discharge products may include primary charging and discharging the lithium air battery for three to five times and secondary charging and discharging the lithium air battery, which has been primarily charged and discharged.

The primary charging and discharging step may include supplying current to the lithium air battery for 10 minutes to 10 hours under conditions of a pressure of 1 to 3 bar, a current of 0.1 to 0.9 mA/cm2, and a voltage of 2.0 to 4.6 V in an oxygen or air atmosphere in order to perform each charging and discharging operation.

The secondary charging and discharging step may include supplying current to the lithium air battery for 10 minutes to 10 hours under conditions of a pressure of 1 to 3 bar, a current of 0.1 to 3.0 mA/cm$^2$, and a voltage of 2.0 to 4.6 V in an oxygen or air atmosphere in order to perform each charging and discharging operation.

The thin-film type discharge products may be at least one lithium oxide selected from the group consisting of Li2O2, LiO2, and LiOH.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
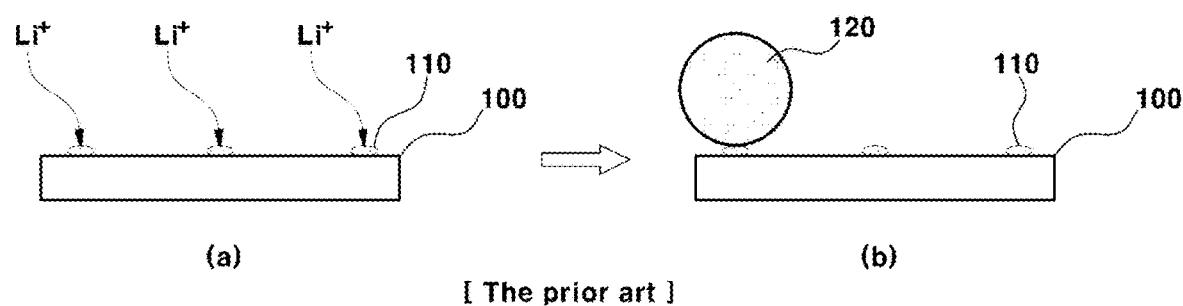
FIG. 1 is a sectional view showing lithium oxide particles formed on a carbon positive electrode of a conventional lithium air battery before and after discharge.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

In general, a lithium air battery generates micrometer-sized spherical discharge products on the surface of a negative electrode through the charging and discharging thereof. Most of the discharge products generated on the surface of the negative electrode are reduced during the charging of the battery. Some unreduced lithium oxide particles block an oxygen channel and impedes the transmission of an electric charge, whereby overvoltage occurs during the charging of the battery. In addition, the unreduced discharge products exhibit low electron conductivity, and therefore it is difficult to dissolve the unreduced discharge products. Conventionally, a method of attaching a conductive catalyst, such as a metal, a metal oxide, a transition metal, or a transition metal oxide, to a carbon positive electrode has been used in order to inhibit the occurrence of overvoltage due to such discharge products.

FIG. 1 is a sectional view showing lithium oxide particles formed on a carbon positive electrode 100 of a conventional lithium air battery before and after discharge. FIG. 1(a) shows that conductive catalyst particles 110 that exhibit a high affinity with lithium ions are attached to the carbon positive electrode 100 before discharge.

FIG. 1(a) shows conductive catalyst particles 110, which exhibit a high affinity with lithium ions, attached to the carbon positive electrode 100 before discharge. FIG. 1(b) shows that spherical discharge products 120 are formed on the catalyst particles 110 after discharge. As shown in FIG. 1, although the conductive catalyst particles 110 are attached to the carbon positive electrode 100, micrometer-sized spherical lithium oxide particles are formed. Due to the micrometer-sized spherical lithium oxide particles, overvoltage in the conventional lithium air battery is still occurred.

In accordance with a form of the present disclosure, a lithium air battery includes that a seed layer for inducing the growth of a thin-film type discharge products is formed on a carbon positive electrode. Due to the seed layer, the number of reaction regions that react with lithium ions is increased. Accordingly, high-speed discharging is possible, and the seed layer induces the growth of the thin-film type discharge products, whereby high-speed charging is possible. The seed layer formed on the carbon positive electrode induces the growth of the thin-film type discharge products due to the high lithium ion conductivity thereof, whereby a high-capacity battery is provided. In addition, overvoltage is reduced due to the short electron movement distance of the thin-film type discharge products, and the lifespan and output of the battery are increased. Furthermore, an electrolyte decomposition reaction is reduced, whereby the stability of the battery is improved.

Hereinafter, a lithium air battery according to the form of the present disclosure and a manufacturing method thereof will be described in detail with reference to the accompanying drawings.

Figure 2:
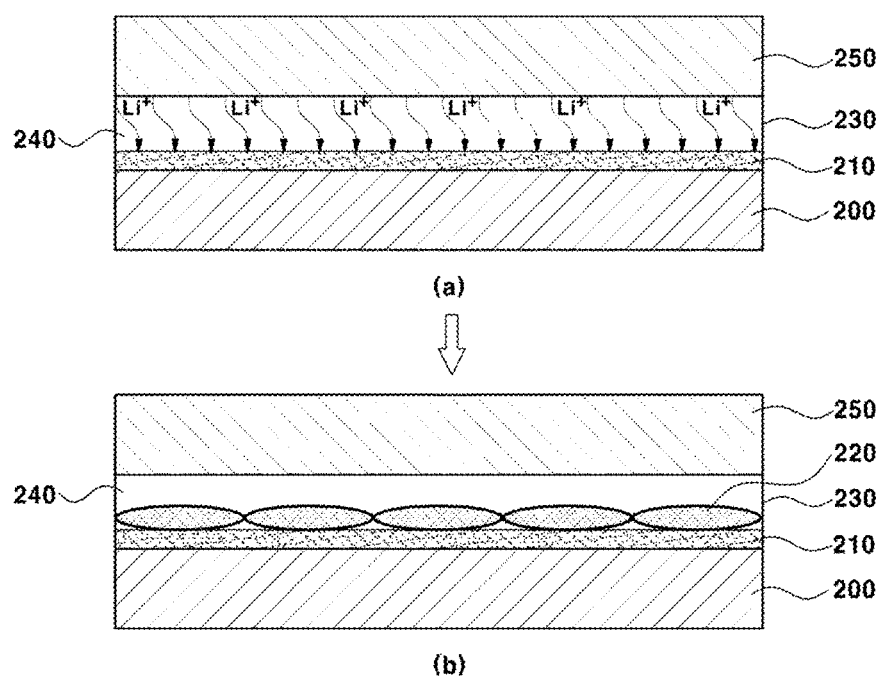
FIG. 2 is a sectional view showing lithium oxide particles formed on a carbon positive electrode of a lithium air battery according to a form of the present disclosure before and after discharge.

FIG. 2 is a sectional view showing lithium oxide particles formed on a carbon positive electrode 200 of a lithium air battery according to the present disclosure before and after discharge. As shown in FIG. 2(a), a seed layer 210 is formed on the carbon positive electrode 200 before discharge, whereby the number of reaction regions that are capable of receiving lithium ions is increased. As a result, the rate of an oxygen reduction reaction (ORR) is increased, whereby high-speed discharging is possible. FIG. 2(b) shows that thin-film type discharge products 220 grow on the seed layer 210 after discharge. The grown thin-film type discharge products 220 have a short electron movement distance, which is advantageous upon charging. Consequently, oxygen evolution reaction (OER) is increased, whereby high-speed charging is possible. In addition, the thin-film type discharge products 220 have a smaller thickness and a larger surface area than the spherical discharge products 120 shown in FIG. 1. Accordingly, the size of an electrochemical reaction region is large, whereby an oxygen evolution reaction (OER) is easily performed during charging.

More specifically, the lithium air battery according to the form of the present disclosure includes a carbon positive electrode 200, a seed layer 210 formed on the carbon positive electrode 200, a separator 230 formed on the seed layer 210, a lithium negative electrode 250 formed on the separator 230, and an electrolyte 240 impregnated in the separator 230. The seed layer 210 may include a non-metal element including lithium (Li), a lithium-based compound, or a mixture thereof.

The seed layer 210 may be formed between the carbon positive electrode 200 and the separator 230 to serve as a nucleation site of discharge products, i.e. lithium oxide particles. In particular, the seed layer 210 may induce the growth of the existing spherical discharge products into thin-film type discharge products 220, since the seed layer 210 exhibits high lithium ion conductivity. Accordingly, the seed layer 210 may include an element or a compound that exhibits a high affinity with lithium ions, which are ionized during discharge. In addition, the seed layer 210 is formed throughout the carbon positive electrode 200, whereby the number of reaction regions that are capable of receiving lithium ions is increased. As a result, the rate of an oxygen reduction reaction (ORR) is increased, whereby high-speed discharging is possible. Specifically, the seed layer 210 may include at least one non-metal element selected from the group consisting of lithium (Li), carbon (C), oxygen (O), nitrogen (N), phosphorus (P), and sulfur (S), the lithium-based compound, to which at least one non-metal element selected from the group consisting of lithium (Li), carbon (C), oxygen (O), nitrogen (N), phosphorus (P), and sulfur (S) is coupled, or the mixture thereof. The lithium-based compound may be at least one selected from the group consisting of $LiNO_3$, $LiNO_2$, $Li_2S_6$, $Li_3P$, $Li_3PO_4$, $Li_xPO_yN_z$ (where $3<x<4.5$, $1.5<y<3.5$, and $0.2<z<1.5$), $Li_2CO_3$ or mixtures thereof.

The carbon positive electrode 200 may be made of a carbon material. However, the present disclosure is not limited thereto.

The seed layer 210 may have a thickness of 1 to 100 nm. If the thickness of the seed layer 210 is less than 1 nm, no small-sized thin-film type discharge products may be formed on the seed layer 210 after charging and discharging. That is, the seed layer may not be uniformly formed on the carbon positive electrode 200, but several seeds may be formed on a portion of the carbon positive electrode 200. In this case, large-sized discharge products may grow only on the portion of the carbon positive electrode 200 on which the seeds are formed. If the thickness of the seed layer 210 is greater than 10 nm, on the other hand, the lithium ion conductivity of the seed layer 210 is reduced, whereby reaction activity may be reduced.

The seed layer 210 may exhibit lithium ion conductivity higher than electron conductivity. The reason is that if lithium ion conductivity is higher than electron conductivity, lithium ions are actively transmitted, whereby thin and uniform discharge products, such as lithium oxide particles, are formed on the seed layer 210. The thin-film type discharge products have a short electron movement distance, which is advantageous to electron conduction. Consequently, overvoltage is lowered, and high-speed charging is possible. Also, if the electron conductivity of the seed layer 210 is low, continuous decomposition of the electrolyte 240 is inhibited or prevented, whereby a reduction in the lifespan of the battery due to the lack of the electrolyte 240 may be inhibited or prevented.

That is, the lithium air battery may be repeatedly charged and discharged to induce the growth of the thin-film type discharge products 220 between the seed layer 210 and the separator 230. The thin-film type discharge products 220 may be at least one lithium oxide selected from the group consisting of $Li_2O_2$, $LiO_2$, and $LiOH$. However, the thin-film type discharge products 220 according to the form of the present disclosure are not limited thereto.

The electrolyte 240 may include lithium salt and an organic solvent. The electrolyte 240 may include lithium salt having a concentration of 0.1 to 5M based on the organic solvent. In this case, the lithium salt may be at least one selected from the group consisting of $LiNO_3$, $LiSCN$, $LiCl$, $LiBr$, $LiI$, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, and $LiN(CF_3CF_2SO_2)_2$. The organic solvent may be at least one selected from the group consisting of an ether-based compound, an amide-based compound, and a sulfur-based compound.

Figure 3:
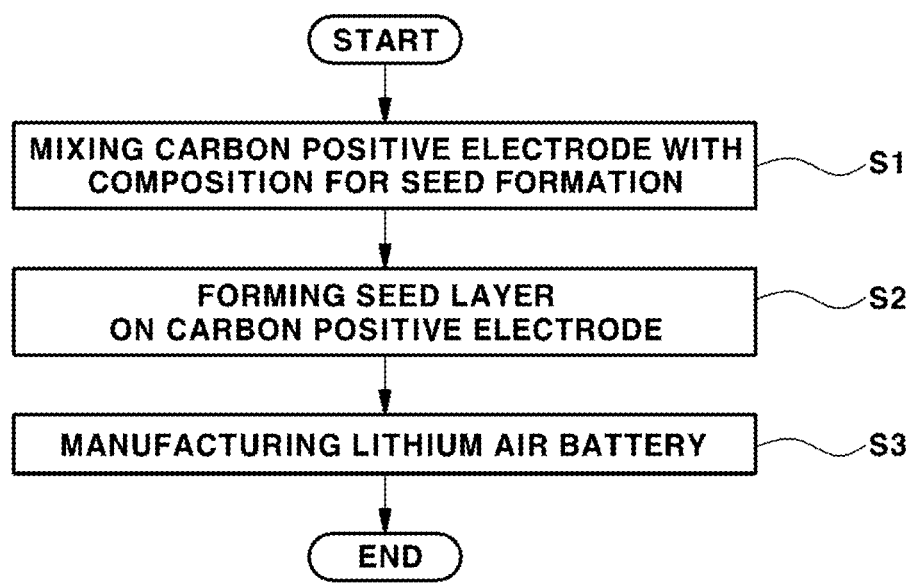
FIG. 3 is a flowchart showing a manufacturing method of a lithium air battery according to the present disclosure.

FIG. 3 is a flowchart showing a manufacturing method of a lithium air battery according to the present disclosure. Referring to FIG. 3, the manufacturing method of the lithium air battery includes a step of mixing a carbon positive electrode 200 with a composition for seed formation (S1), a step of forming a seed layer 210 on the carbon positive electrode 200 (S2), and a step of manufacturing a lithium air battery (S3).

More specifically, the manufacturing method of the lithium air battery according to the present disclosure may include a step of mixing a carbon positive electrode 200 with a composition for seed formation, a step of forming a seed layer 210 on the carbon positive electrode 200, and a step of manufacturing a lithium air battery including the carbon positive electrode 200 having the seed layer 210 thereon, a lithium negative electrode 250, a separator 230 disposed between the carbon positive electrode 200 having the seed layer 210 thereon and the lithium negative electrode 250, and an electrolyte 240 impregnated in the separator 230. The seed layer 210 may include a non-metal element including lithium (Li), a lithium-based compound, or a mixture thereof.

The steps of the manufacturing method of the lithium air battery according to the present disclosure will be described in detail.

1) Step of Mixing a Carbon Positive Electrode 200 with a Composition for Seed Formation (S1)

At the step of mixing a carbon positive electrode 200 with a composition for seed formation (S1), the carbon positive electrode 200 may be soaked in the composition for seed formation in order to form a seed layer 210 on the carbon positive electrode 200. In this case, the composition for seed formation may include a lithium-based compound and an organic solvent. The composition for seed formation may include a lithium-based compound having a concentration of 0.1 to 5M based on the organic solvent. The lithium-based compound may be at least one selected from the group consisting of $LiNO_3$, $LiNO_2$, $Li_2S_6$, $Li_3P$, $Li_3PO_4$, $Li_x$-

POyNz (where 3<x<4.5, 1.5<y<3.5, and 0.2<z<1.5), Li2CO3 or mixtures thereof. The organic solvent may be at least one selected from the group consisting of dimethylacetamide, N-methylformamide, N-methylpyrrolidone, and diethylacetamide.

2) Step of Forming a Seed Layer 210 on the Carbon Positive Electrode 200 (S2)

At the step of forming a seed layer 210 on the carbon positive electrode 200 (S2), current may be supplied to the composition for seed formation in order to perform electrolysis after the carbon positive electrode 200 is soaked in the composition for seed formation at step (S1). Specifically, at the step of forming the seed layer 210, current is supplied to the composition for seed formation, with which the carbon positive electrode 200 is mixed, for 10 minutes to 10 hours under conditions of a pressure of 1 to 3 bar, a current of 0.1 to 0.9 mA/cm2, and a voltage of 2.0 to 4.6 V in order to perform electrolysis. If each of the current and voltage has a value lower than the above range, the seed layer 210 may not be properly formed on the carbon positive electrode 200. On the other hand, if each of the current and voltage has a value higher than the above range, the electrolyte 240 is continuously decomposed at a high voltage, whereby a thick seed layer having a thickness of 100 nm or more may be formed.

When current is supplied to the composition for seed formation, the lithium-based compound is ionized, whereby oxygen functional groups existing on the surface of the carbon positive electrode 200 and oxygen radicals (O2—), LiO2, or Li2O2, exhibiting high reactivity, generated due to defects in the carbon material or during discharge, are combined with each other as the result of the electrolyte 240 decomposition reaction to form the seed layer 210. At this time, the seed layer 210 may be formed on the entire surface of the carbon positive electrode 200.

The seed layer 210 may be formed of a non-metal element including lithium (Li), a lithium-based compound, or a mixture thereof. Particularly, in the case of the non-metal element including lithium, the lithium-based compound contained in the composition for seed formation may be ionized through electrolysis, and the element may be coupled to the oxygen functional groups on the surface of the carbon positive electrode 200 to form the seed layer 210. That is, during electrochemical decomposition, the element may be coupled to the surface of the carbon positive electrode 200 according to a principle like plating to form the seed layer 210. Specifically, the non-metal element including lithium may be at least one non-metal element selected from the group consisting of lithium (Li), carbon (C), oxygen (O), nitrogen (N), phosphorus (P), and sulfur (S). The lithium-based compound may be the lithium-based compound, to which at least one non-metal element selected from the group consisting of lithium (Li), carbon (C), oxygen (O), nitrogen (N), phosphorus (P), and sulfur (S) is coupled. Alternatively, the seed layer 210 may be formed using both the non-metal element including lithium and the lithium-based compound. The lithium-based compound may be at least one selected from the group consisting of LiNO3, LiNO2, Li2S6, Li3P, Li3PO4, LixPOyNz (where 3<x<4.5, 1.5<y<3.5, and 0.2<z<1.5), Li2CO3 or mixtures thereof.

3) Step of Manufacturing a Lithium Air Battery (S3)

The step of manufacturing a lithium air battery (S3) may be a step of manufacturing a lithium air battery including the carbon positive electrode 200 having the seed layer 210 thereon, a lithium negative electrode 250, a separator 230 disposed between the carbon positive electrode 200 having the seed layer 210 thereon and the lithium negative electrode 250, and an electrolyte 240 impregnated in the separator 230. At step S3, a lithium air battery may be manufactured with the carbon positive electrode 200 having the seed layer 210 thereon, manufactured at step S2.

The manufacturing method may further include a step of repeatedly charging and discharging the lithium air battery to induce the growth of thin-film type discharge products 220 between the seed layer 210 and the separator 230 after the step (S3). At the step of inducing the growth of thin-film type discharge products 220, oval discharge products having a large surface area may grow on the seed layer 210 between the seed layer 210 and the separator 230, and eventually the thin-film type discharge products 220 may be formed.

The step of inducing the growth of thin-film type discharge products 220 may include a step of primary charging and discharging the lithium air battery three to five times and a step of secondary charging and discharging the lithium air battery, which has been primarily charged and discharged. The reason that the lithium air battery is primarily and secondarily charged and discharged is that if the lithium air battery is initially charged and discharged in the state in which high current is supplied, spherical discharge products and oval discharge products grow simultaneously on the seed layer 210. In addition, the spherical discharge products generated in this process have a long electron movement distance, whereby overvoltage may be induced. In the present disclosure, in order to inhibit the induced overvoltage, charging and discharging are performed using low current during primary charging and discharging, and when the process reaches a charging and discharging cycle in which only oval discharge products grow, charging and discharging are performed using high current. Accordingly, the thin-film type discharge products 220 may be formed on the carbon positive electrode 200.

Specifically, at the primary charging and discharging step, current may be supplied to the lithium air battery for 10 minutes to 10 hours under conditions of a pressure of 1 to 3 bar, a current of 0.1 to 0.9 mA/cm2, and a voltage of 2.0 to 4.6 V in an oxygen or air atmosphere in order to perform each charging and discharging operation. If the current is less than 0.1 mA/cm2, the seed layer may not be properly formed. On the other hand, if the current exceeds 0.9 mA/cm2, a thick seed layer may be formed, or overvoltage may be increased, whereby the process may be terminated due to a reduction in the voltage of the battery.

In the case in which the primary charging and discharging step is performed, as described above, the thin-film type discharge products 220 are decomposed at low overvoltage during charge, whereby a large amount of oxygen may be generated. That is, the reversible oxygen efficiency of the lithium air battery that has been primarily charged and discharged may be 85 to 90%. The reversible oxygen efficiency is defined as follows. When oxygen injected into the lithium air battery is discharged, i.e. when an oxygen reduction reaction (ORR) occurs, a reversible reaction with lithium occurs, as represented by Reaction Formula 1, and no oxygen is consumed as another side reaction. When charging is performed, i.e. when an oxygen evolution reaction (OER) occurs, a reversible reaction occurs to generate oxygen without another side reaction, as represented by Reaction Formula 2. The ratio of ORR to OER is the reversible oxygen efficiency.

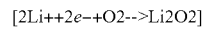
Reaction Formula 1:

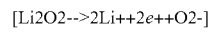
Reaction Formula 2:

In addition, the primary charging and discharging is preferably performed for three to five cycles. The reason is that if the primary charging and discharging is performed for less than three cycles, spherical discharge products grow, whereby overvoltage may be caused. On the other hand, if the primary charging and discharging is performed for more than five cycles, it is difficult to increase the effect of growing the thin-film type discharge products 220 on the seed layer 210.

At the secondary charging and discharging step, current may be supplied to the lithium air battery for 10 minutes to 10 hours under conditions of a pressure of 1 to 3 bar, a current of 0.1 to 3.0 mA/cm2, and a voltage of 2.0 to 4.6 V in an oxygen or air atmosphere in order to perform charging and discharging. If the current exceeds 3.0 mA/cm2, discharge products, such as Li2O2, are difficult to be dissolved during charging because it exhibits low ion conductivity or electron conductivity, even though the discharge products are thin-film type discharge products on the seed layer 210. As a result, the discharge products may be deteriorated due to the limited conductivity thereof. Since the thin-film type discharge products have already grown on the seed layer through the primary charging and discharging, charging and discharging may be performed using high current.

The thin-film type discharge products grown on the seed layer 210 through the primary and secondary charging and discharging stages may be at least one lithium oxide from the group consisting of Li2O2, LiO2, and LiOH.

Hereinafter, the present disclosure will be described in more detail with reference to an example. However, the present disclosure is not limited by the following example.

Example (1) Formation of a Seed Layer on a Carbon Positive Electrode 1M of $LiNO_3$ (a lithium-based compound) was mixed with dimethylacetamide (DMAc) to prepare a composition for seed formation. Graphitic carbon and a polytetrafluoroethylene (PTFE) binder were dry-mixed at a weight ratio of 9:1, and then a carbon positive electrode was manufactured using a free-standing electrode. At this time, the thickness of the carbon positive electrode was 200 μm, and the amount of a carbon material that was loaded to manufacture the carbon positive electrode was 5 mg/cm$^2$.

The carbon positive electrode was soaked in the composition for seed formation, and current was supplied to the composition for seed formation for 10 hours under conditions of a pressure of 2 bar, a current of 0.5 mA/cm$^2$, and a voltage of 2.0 in order to perform electrolysis. At this time, the charging and discharging cycle was repeatedly performed five times to form a seed layer having a thickness of 2 to 3 nm on one surface of the carbon positive electrode.

(2) Manufacture of a Lithium Air Battery

Polyethylene having a thickness of 25 μm was prepared as a separator, and the separator was impregnated with 100 μl of an electrolyte obtained by mixing 1M of $LiNO_3$ with dimethylacetamide (DMAc). Lithium metal foil having a thickness of 500 μm was prepared as a lithium negative electrode. Next, the separator was formed on the seed layer of the carbon positive electrode manufactured at the above step, and the lithium negative electrode was formed on the separator to manufacture a coin-cell-shaped lithium air battery.

Comparative Example 1

A lithium air battery was manufactured using the same method as in Example, except that a seed layer was not formed on a carbon positive electrode and that an electrolyte obtained by mixing 1M of LiTFSI with tetraethylene glycol dimethyl ether (TEGDME) was used as an electrolyte with which a separator was impregnated.

Comparative Example 2

A lithium air battery was manufactured using the same method as in Example, except that a seed layer was not formed on a carbon positive electrode and that a high current of 1~3 mA/cm2 was supplied instead of a low current of 0.1~0.9 mA/cm2 for seed formation. In addition, a separator was impregnated with 100 μl of an electrolyte obtained by mixing 1M of LiNO3 with dimethylacetamide (DMAc) in the same manner as in Example.

Experimental Example 1: Analysis of Ingredients of the Seed Layer on the Carbon Positive Electrode Measurement was performed using X-ray photoelectron spectroscopy (XPS) in order to analyze the ingredients of the seed layer formed on the carbon positive electrode manufactured according to Example. As measurement samples, a pure carbon positive electrode (Pristine) and the carbon positive electrode having the seed layer thereon manufactured according to Example above. The results are shown in FIGS. 4 to 7.

Figure 4:
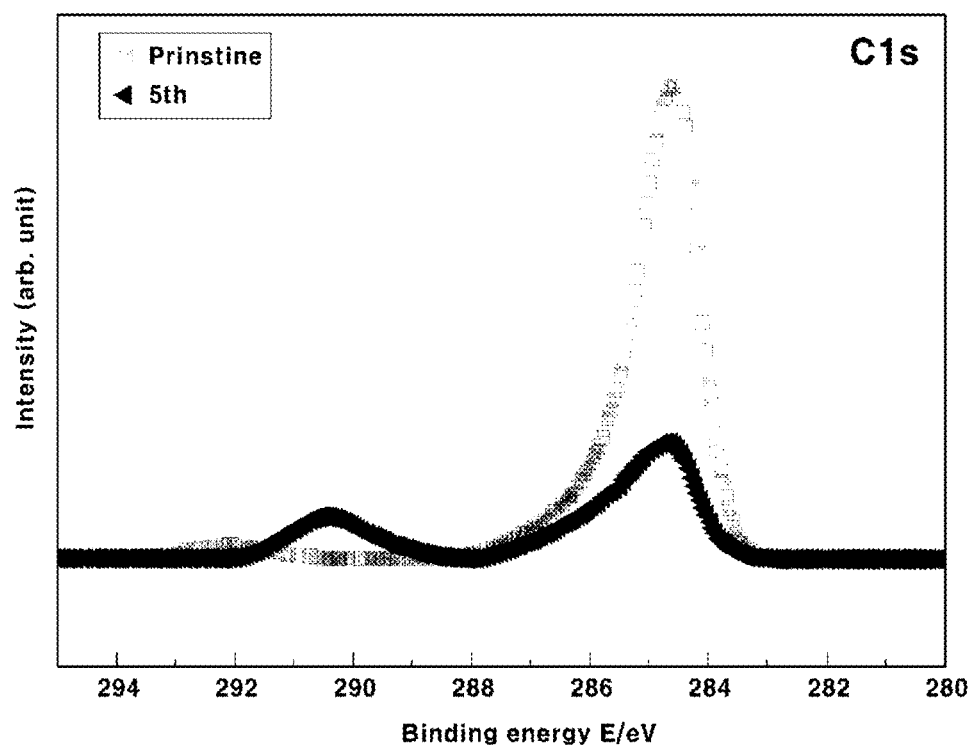
FIG. 4 is a graph showing a binding energy of a carbon element in a seed layer generated on a carbon positive electrode according to Example.
Figure 5:
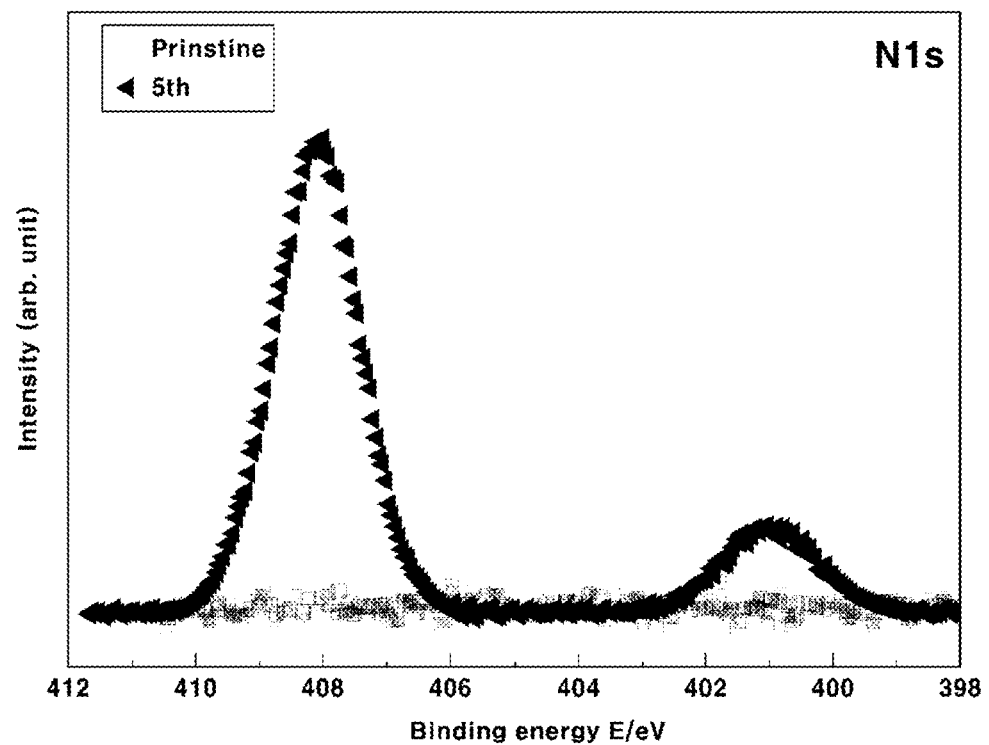
FIG. 5 is a graph showing a binding energy of a nitrogen element in the seed layer generated on the carbon positive electrode according to Example.
Figure 6:
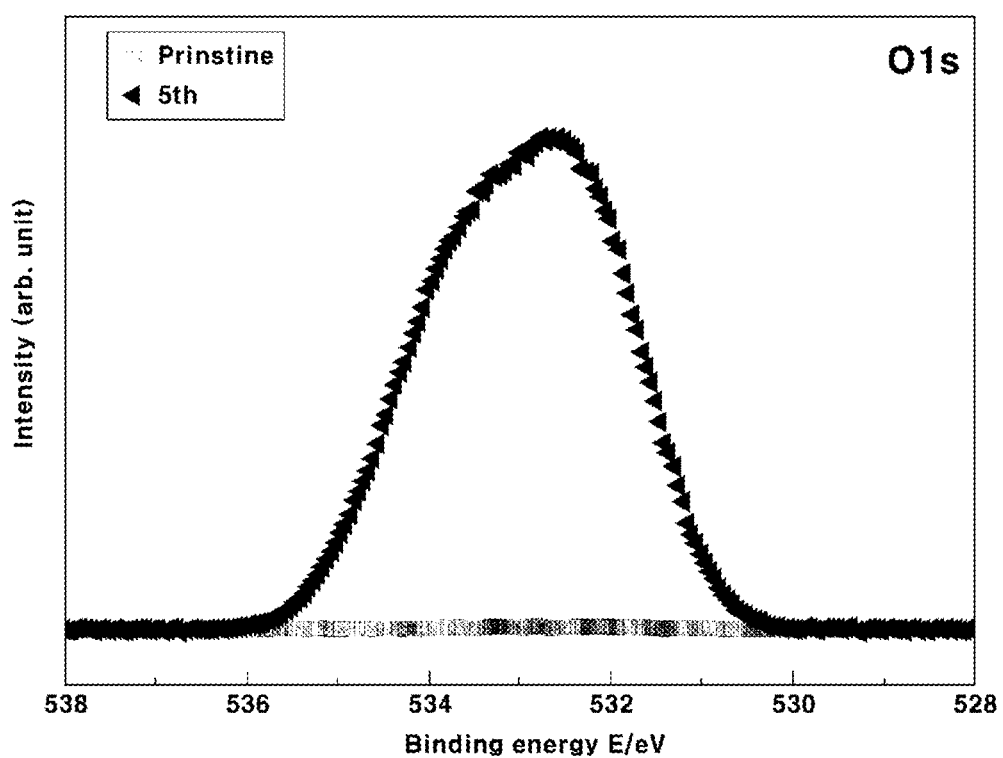
FIG. 6 is a graph showing a binding energy of an oxygen element in the seed layer generated on the carbon positive electrode according to Example.
Figure 7:
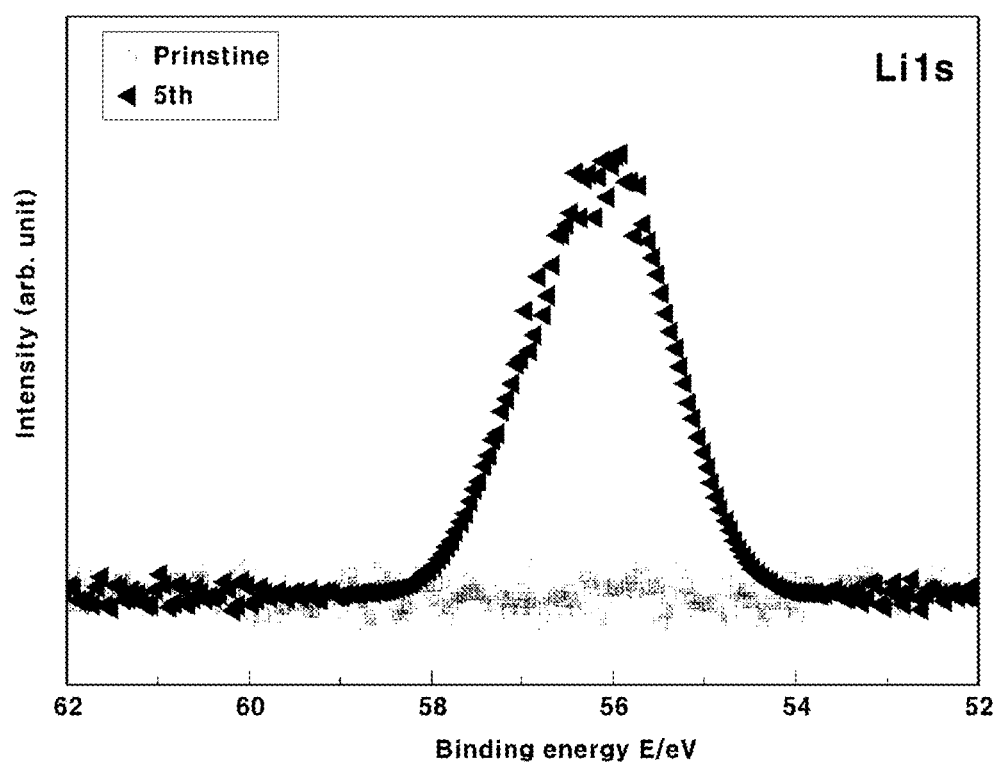
FIG. 7 is a graph showing a binding energy of a lithium element in the seed layer generated on the carbon positive electrode according to Example.

FIGS. 4 to 7 are graphs showing the binding energies of elements (carbon, nitrogen, oxygen, and lithium) detected from the seed layer formed on the carbon positive electrode according to Example. Referring to FIG. 4, it can be seen that a carbon element had a peak at about 285 eV. Since the carbon element for the carbon positive electrode according to Example had lower intensity than that for the pure carbon positive electrode, however, it can be seen that a seed layer formed of a compound including the carbon element, rather than a pure carbon material, was formed on the carbon positive electrode. Referring to FIG. 5, it can be seen that a nitrogen element, which was not detected in the pure carbon positive electrode, had a peak at about 408 eV. Referring to FIGS. 6 and 7, it can be seen that an oxygen element had a peak at about 533 eV and that a lithium element had a peak at about 56 eV.

As shown in FIGS. 4 to 7, it can be seen that the intensity of the carbon element, which was also detected in the pure carbon positive electrode, was somewhat reduced due to the coupling of the carbon element with the compound formed on the surface of the carbon positive electrode according to Example and that the nitrogen, oxygen, and lithium elements, which were not detected in the pure carbon positive electrode, were detected in the carbon positive electrode according to Example, whereby the seed layer was formed on the carbon positive electrode.

Experimental Example 2-1: Analysis of Gas in the Lithium Air Battery During Initial Charging and Discharging The charge and discharge potentials of the lithium air batteries manufactured according to Example and Comparative Example 1 and the amount of gas, such as O2 and CO2, generated therein during initial charging and discharging thereof were measured by using a differential electrochemical mass spectrometer (DEMS), which is a gas analyzer. Current was supplied to the lithium air batteries for 120 minutes under conditions of a pressure of 2 bar, a current of 0.5 mA/cm2, and a voltage of 2.0 V in an oxygen atmosphere in order to perform each charging and discharging operation. The results are shown in FIGS. 8A to 12B.

Figure 8A:
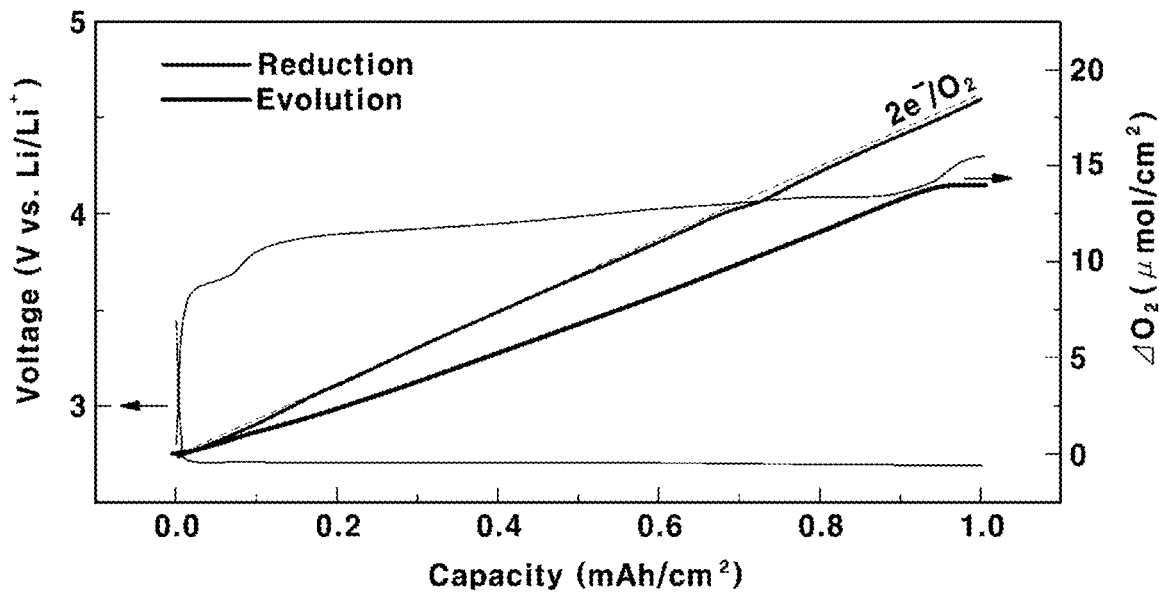
FIG. 8A is a graph showing charge and discharge potentials after a lithium air battery manufactured according to Example is charged and discharged once.
Figure 9A:
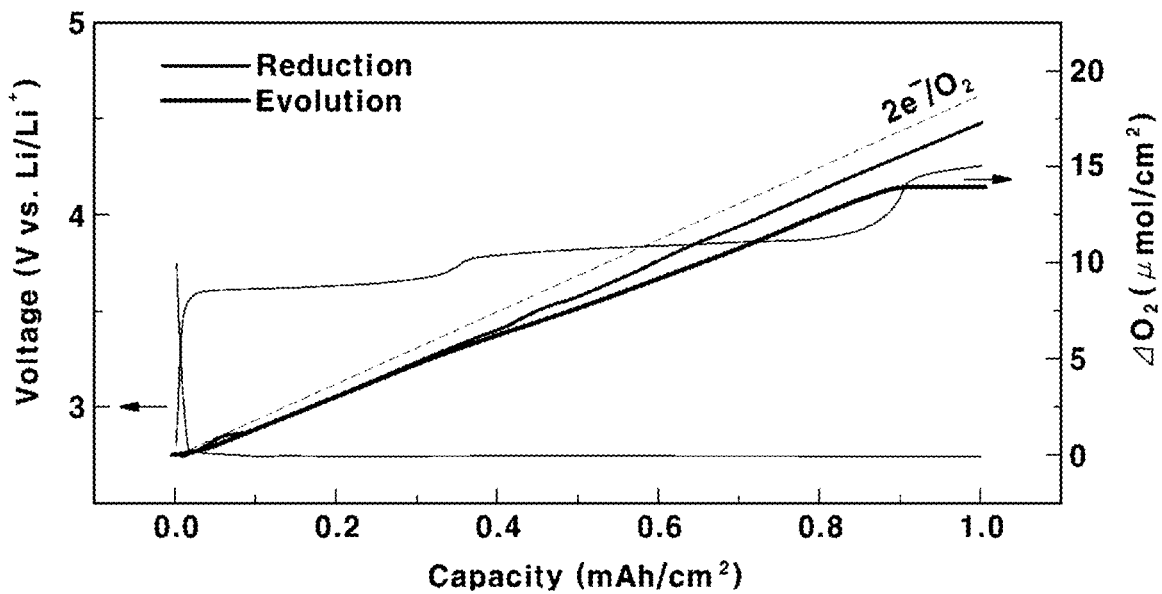
FIG. 9A is a graph showing charge and discharge potentials after the lithium air battery manufactured according to Example is charged and discharged three times.
Figure 10A:
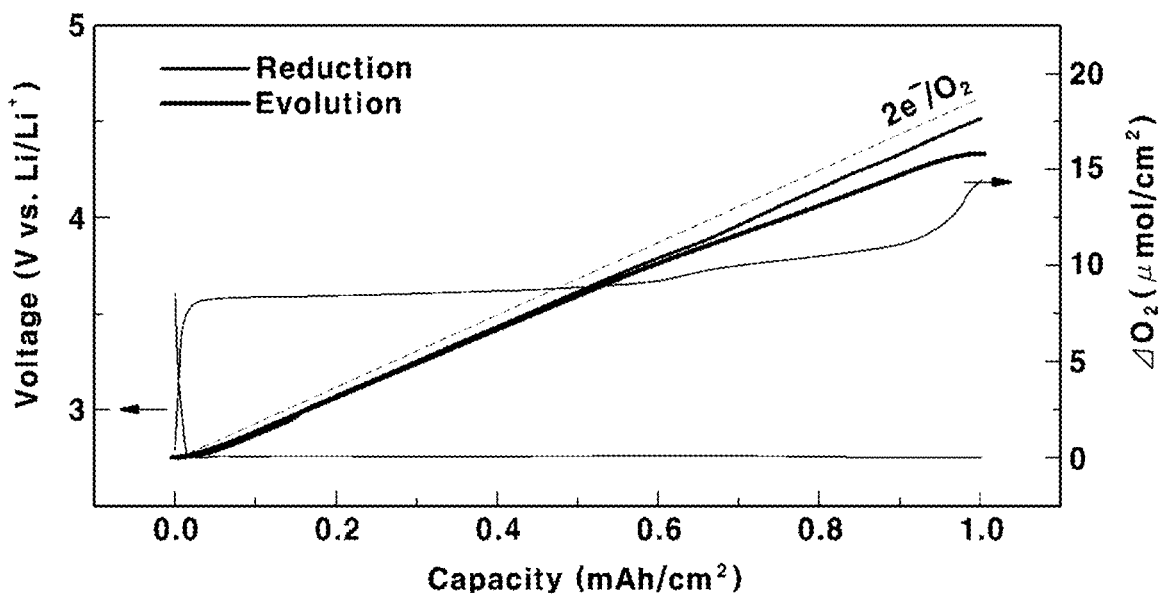
FIG. 10A is a graph showing charge and discharge potentials after the lithium air battery manufactured according to Example is charged and discharged five times.

FIGS. 8A, 9A, and 10A are graphs showing charge and discharge potentials after the lithium air battery manufactured according to Example was charged and discharged once, three times, and five times, respectively. Referring to FIG. 8A, it can be seen that spherical discharge products such as $Li_2O_2$ were formed as the result of reaction between the carbon positive electrode and the electrolyte, whereby overvoltage is occurred. FIG. 9A shows that the size of discharge products was smaller than the case of FIG. 8A, whereby overvoltage was somewhat reduced. FIG. 10A shows that thin-film type discharge products were formed on the seed layer on the carbon positive electrode after being charged and discharged five times, whereby overvoltage was greatly reduced.

Figure 8B:
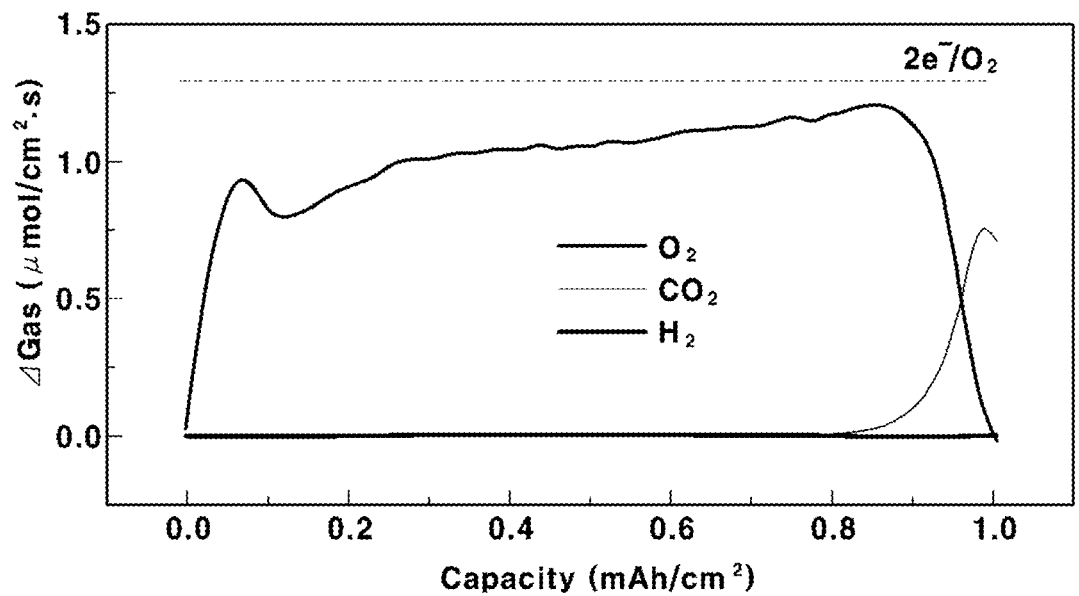
FIG. 8B is a graph showing gas variation after the lithium air battery manufactured according to Example is charged and discharged once.
Figure 9B:
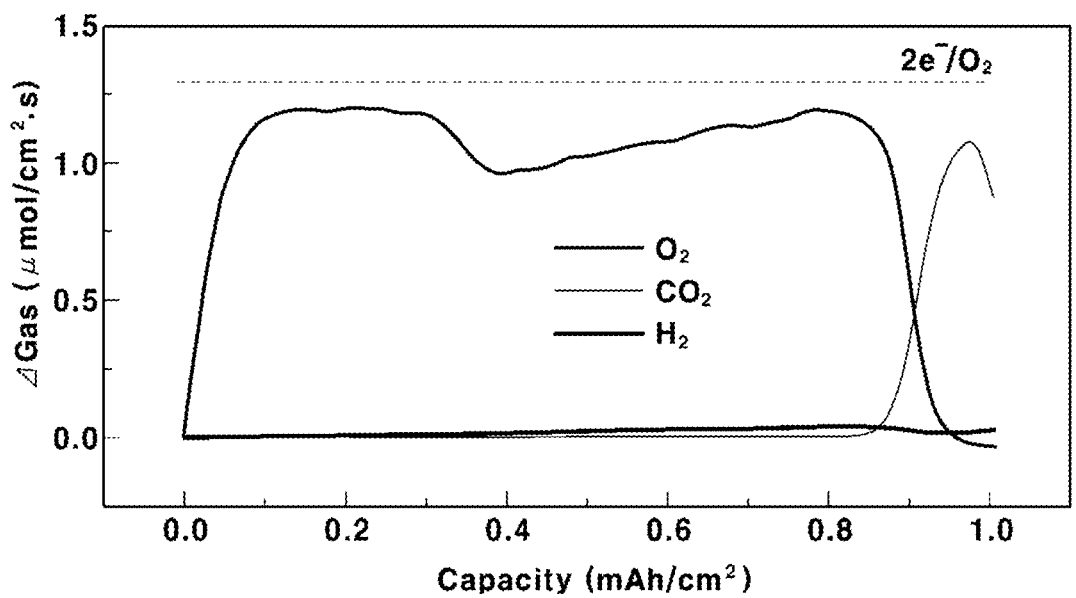
FIG. 9B is a graph showing gas variation after the lithium air battery manufactured according to Example is charged and discharged three times.
Figure 10B:
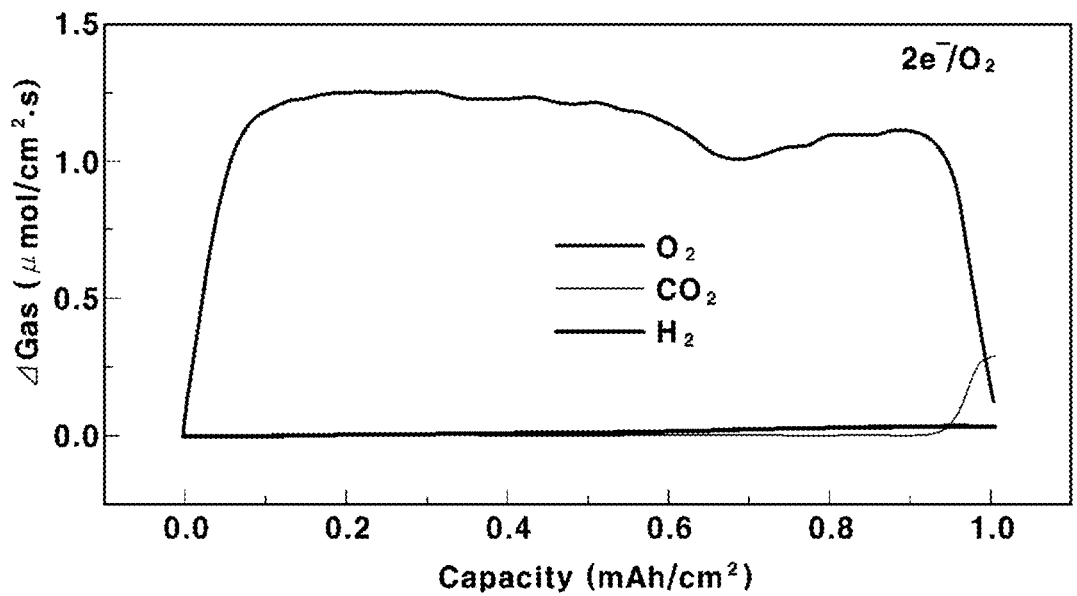
FIG. 10B is a graph showing gas variation after the lithium air battery manufactured according to Example is charged and discharged five times.

FIGS. 8B, 9B, and 10B are graphs showing gas variation after the lithium air battery manufactured according to Example is charged and discharged once, three times, and five times, respectively. FIGS. 8B and 9B show that at the initial stage, the electrolyte was decomposed on the surface of the seed layer on the carbon positive electrode, whereby $CO_2$ was generated. When the number of charging and discharging cycles was 5, thin-film type discharge products grew on the seed layer on the carbon positive electrode. FIG. 10B shows that the electrolyte was not decomposed any more, whereby the amount of $CO_2$ was abruptly reduced.

Figure 11:
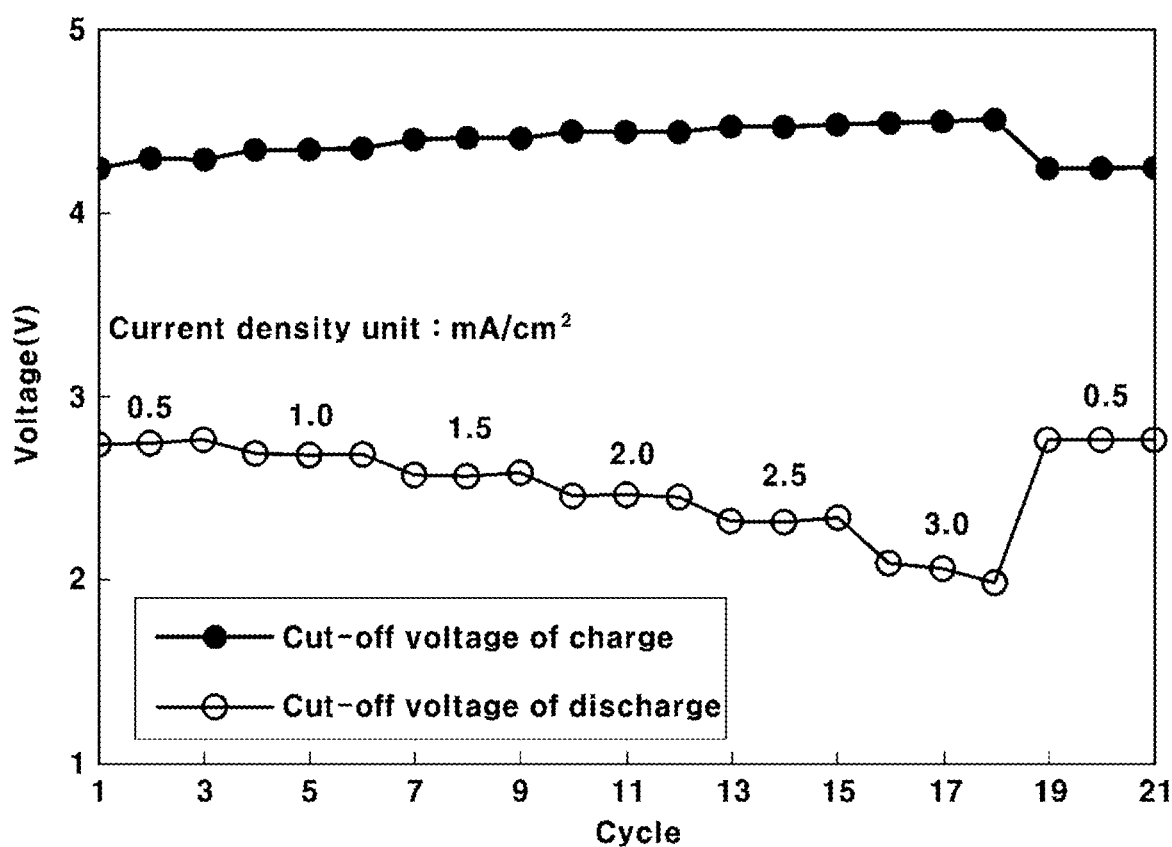
FIG. 11 is a graph showing variation in current and voltage depending on the number of charging and discharging cycles of the lithium air battery manufactured according to Example.

FIG. 11 is a graph showing variation in current and voltage depending on the number of charging and discharging cycles of the lithium air battery manufactured according to Example. Referring to FIG. 11, it can be seen that charging and discharging were performed at 0.5 mA/cm2 five times, whereby thin-film type discharge products were formed on the seed layer on the carbon positive electrode. In addition, it can be seen that after five times, charging and discharging were performed three times at intervals of 0.5 mA/cm2 within a current range of 1.0~3.0 mA/cm2, whereby the density of current was increased. It can be seen that the density of current was uniformly maintained without a reduction of voltage until 2.5 mA/cm2. At 3 mA/cm2, however, voltage was reduced in proportion to an increase in the number of cycles. Consequently, it can be expected that the density of current is limited at 3 mA/cm2.

In addition, it can be seen that when current was changed from 3 mA/cm2 to 0.5 mA/cm2, voltage was recovered as at the initial 0.5 mA/cm2, whereby a reversible reaction was performed without a side reaction due to an increase in the density of current. For a general battery, a side reaction of the electrolyte or twisting of an electrode structure occurs due to an increase in the density of current. In this case, when current is changed from a high value to a low value, an irreversible reaction occurs.

Figure 12A:
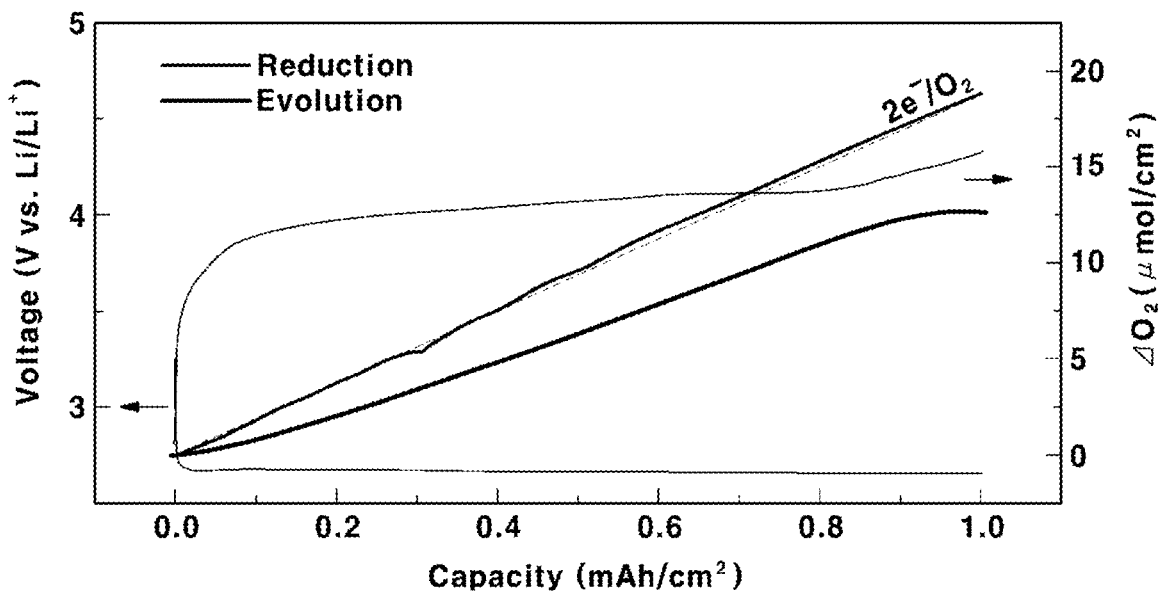
FIG. 12A is a graph showing charge and discharge potentials after a lithium air battery according to Comparative Example 1 is charged and discharged five times.

FIG. 12A is a graph showing charge and discharge potentials after the lithium air battery according to Comparative Example 1 is charged and discharged five times. FIG. 12A shows that spherical discharge products grew on the carbon positive electrode, whereby the decomposition of the discharge products was difficult, and that the electron movement distance was increased, whereby overvoltage was greatly increased.

Figure 12B:
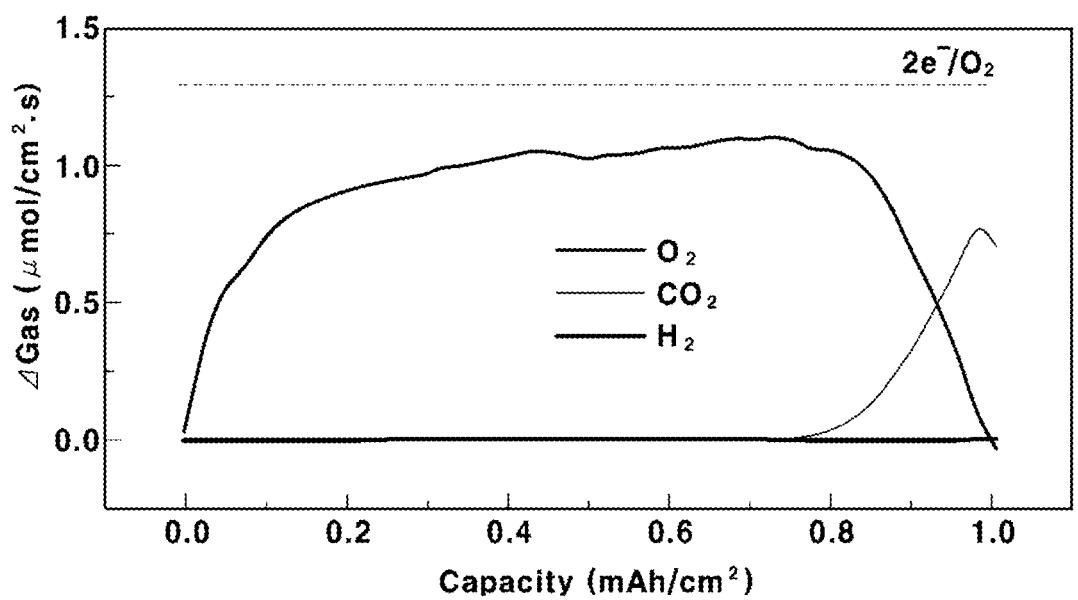
FIG. 12B is a graph showing gas variation after the lithium air battery manufactured according to Comparative Example 1 is charged and discharged five times.

FIG. 12B is a graph showing gas variation after the lithium air battery manufactured according to Comparative Example 1 is charged and discharged five times. FIG. 12B shows that spherical discharge products grew on the surface of the carbon positive electrode, whereby overvoltage is occurred, and therefore the electrolyte was decomposed, whereby $CO_2$ was generated.

Experimental Example 2-2: SEM Analysis of the Discharge Products Formed on the Seed Layer on the Carbon Positive Electrode The lithium air battery was initially charged and discharged as in Experimental Example 2-1, and was disassembled. The section of the seed layer was measured using a transmission electron microscope (TEM) and a scanning electron microscope (SEM) in order to determine whether discharge products grew on the seed layer on the carbon positive electrode. The results are shown in FIGS. 13 to 20. In the case of the TEM, particles having a size of several hundreds of nm were transmitted to check the section layer of the surface.

Figure 13:
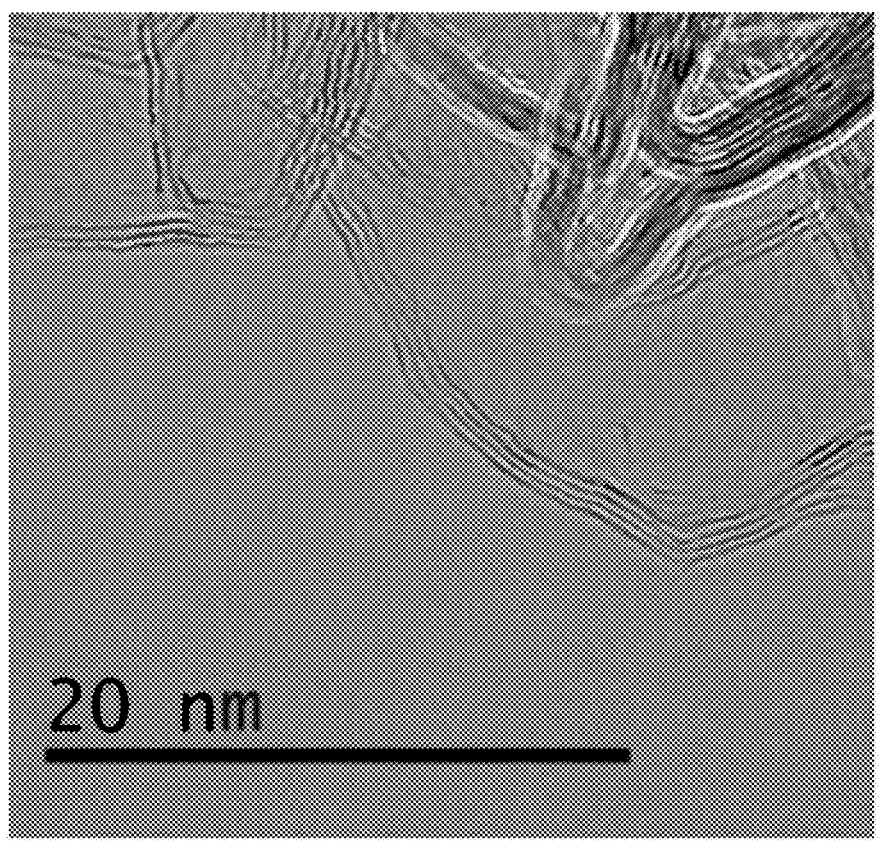
FIG. 13 is a TEM photograph showing the section of the seed layer on the carbon positive electrode before a lithium air battery manufactured according to Example is charged and discharged.
Figure 14:
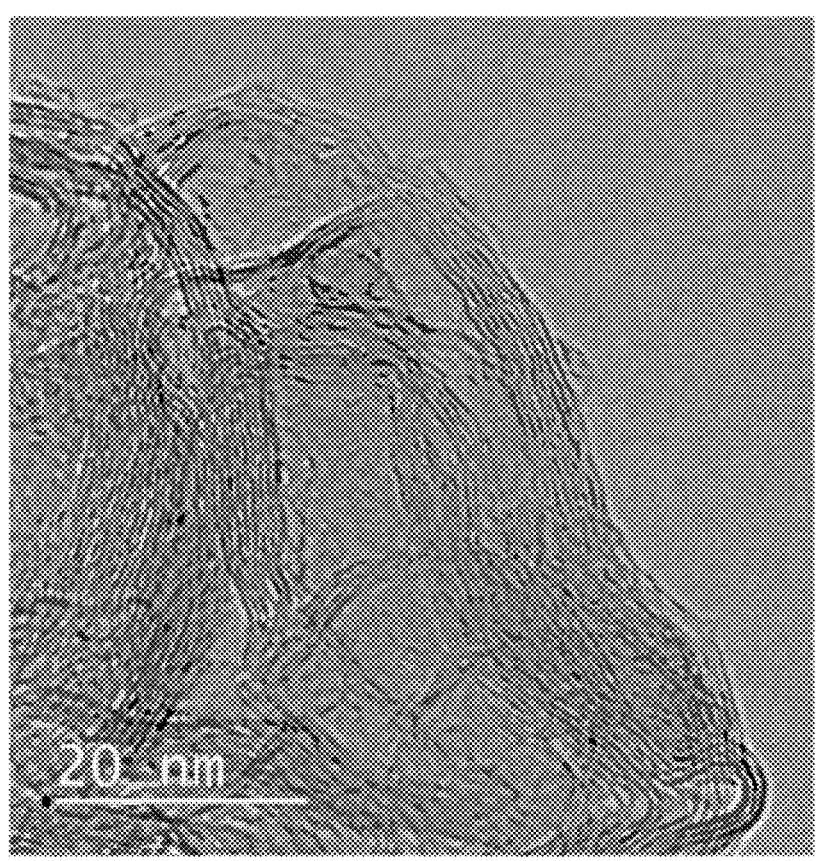
FIG. 14 is a TEM photograph showing the section of the seed layer on the carbon positive electrode after the lithium air battery manufactured according to Example is charged and discharged once.

FIG. 13 is a TEM photograph showing the section of the seed layer on the carbon positive electrode before the lithium air battery manufactured according to Example is charged and discharged. FIG. 14 is a TEM photograph showing the section of the seed layer on the carbon positive electrode after the lithium air battery manufactured according to Example is charged and discharged once. FIGS. 13 and 14 show that a uniform and thin seed layer was formed on the carbon positive electrode and that the seed layer was of an island type.

Figure 15:
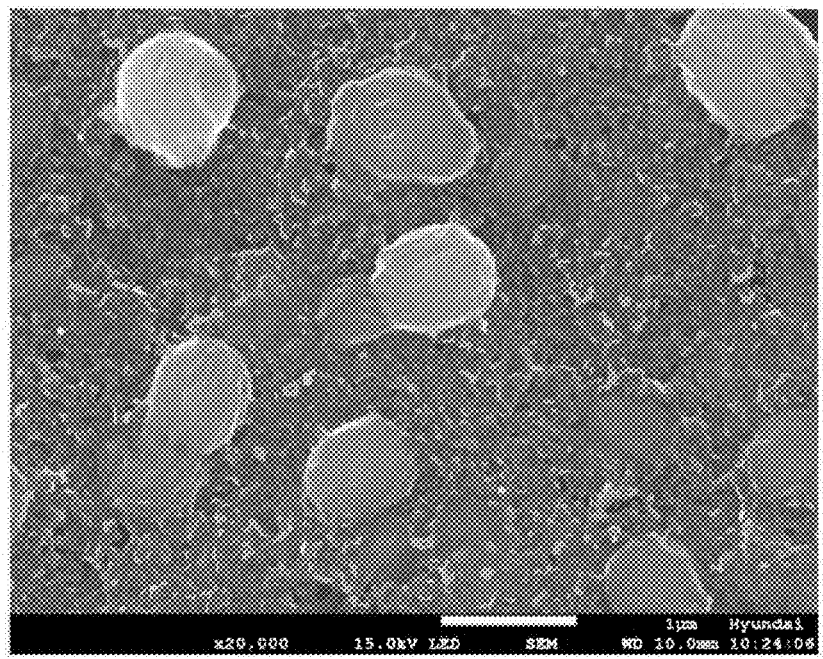
FIG. 15 is an SEM micrograph showing discharge products generated on the discharged carbon positive electrode after the lithium air battery manufactured according to Example is charged and discharged once.

FIG. 15 is an SEM micrograph showing discharge products generated on the discharged carbon positive electrode after the lithium air battery manufactured according to Example is charged and discharged once. FIG. 15 shows that spherical discharge products were formed on a portion of the surface of the seed layer on the carbon positive electrode.

Figure 16:
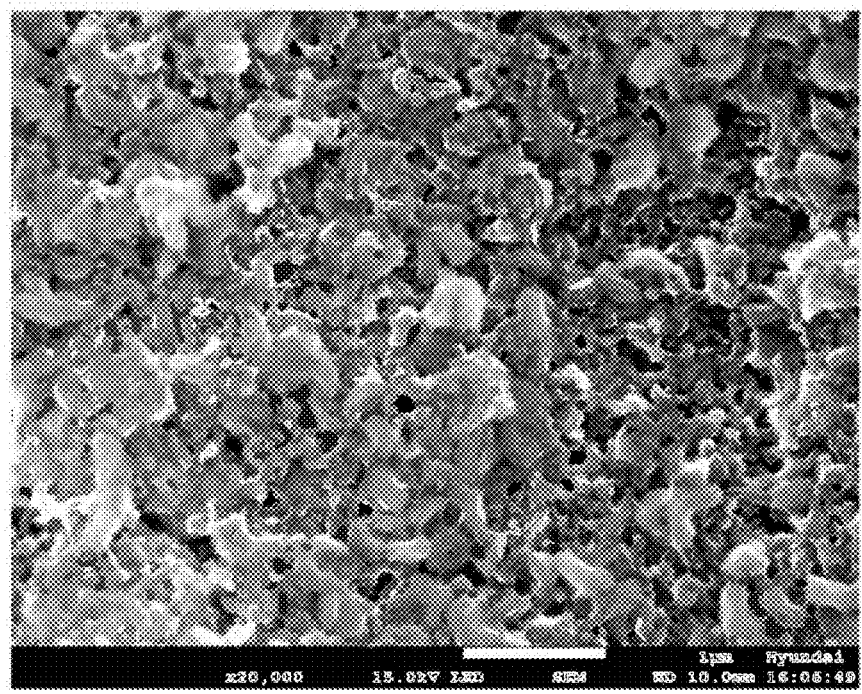
FIG. 16 is an SEM micrograph showing the section of the seed layer on the carbon positive electrode after the lithium air battery manufactured according to Example is charged and discharged three times.

FIG. 16 is an SEM micrograph showing the section of the seed layer on the carbon positive electrode after the lithium air battery manufactured according to Example is charged and discharged three times. FIG. 16 shows that thin-film type discharge products were formed throughout the surface of the seed layer.

Figure 17:
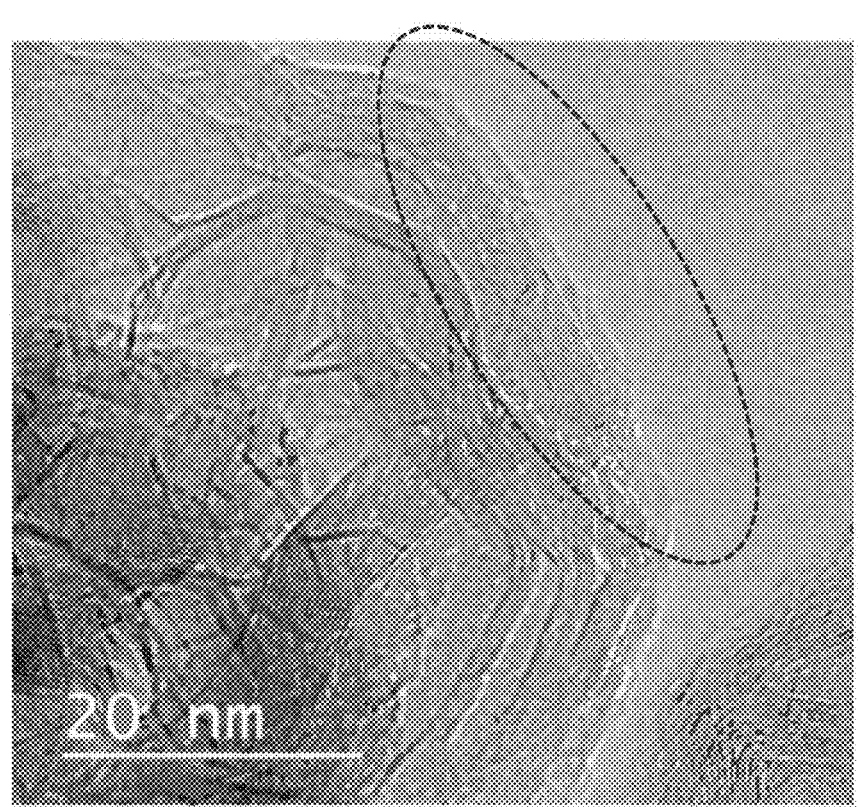
FIG. 17 is a TEM photograph showing the section of the seed layer on the charged carbon positive electrode after the lithium air battery manufactured according to Example is charged and discharged five times.
Figure 18:
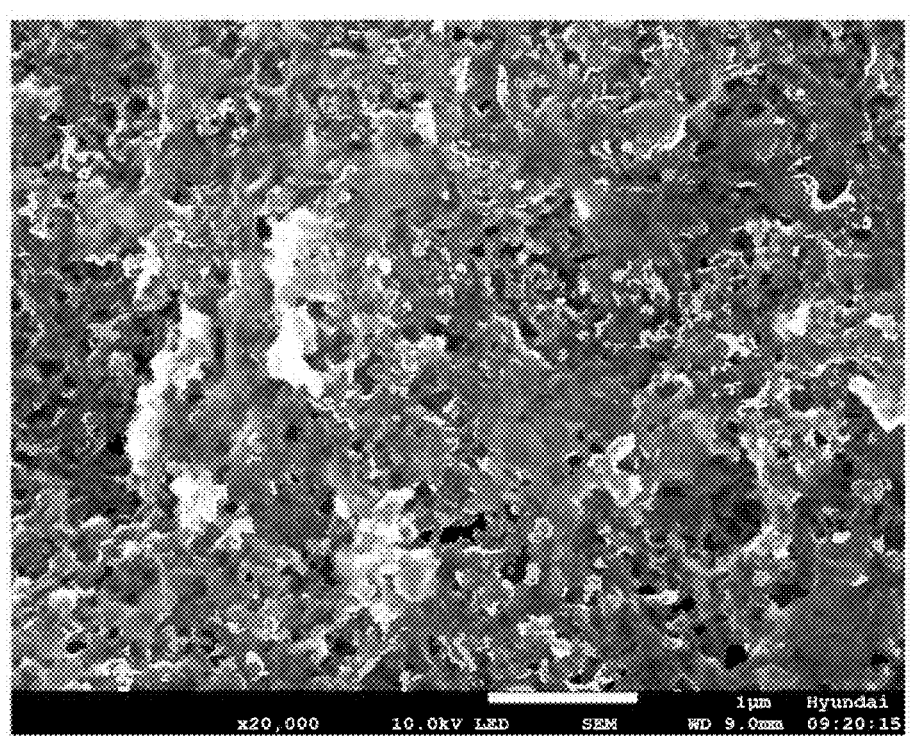
FIG. 18 is an SEM micrograph showing discharge products generated on the discharged carbon positive electrode after the lithium air battery manufactured according to Example is charged and discharged five times.

FIG. 17 is a TEM photograph showing the section of the seed layer on the charged carbon positive electrode after the lithium air battery manufactured according to Example is charged and discharged five times, and FIG. 18 is an SEM micrograph showing discharge products generated on the discharged carbon positive electrode after the lithium air battery manufactured according to Example is charged and discharged five times. FIG. 17 shows that a thin and uniform seed layer was formed on the carbon positive electrode. FIG. 18 shows that the seed layer was covered with discharge products thinner than those shown in FIG. 16, whereby the entire surface of the seed layer was in a thin-film state.

Figure 19:
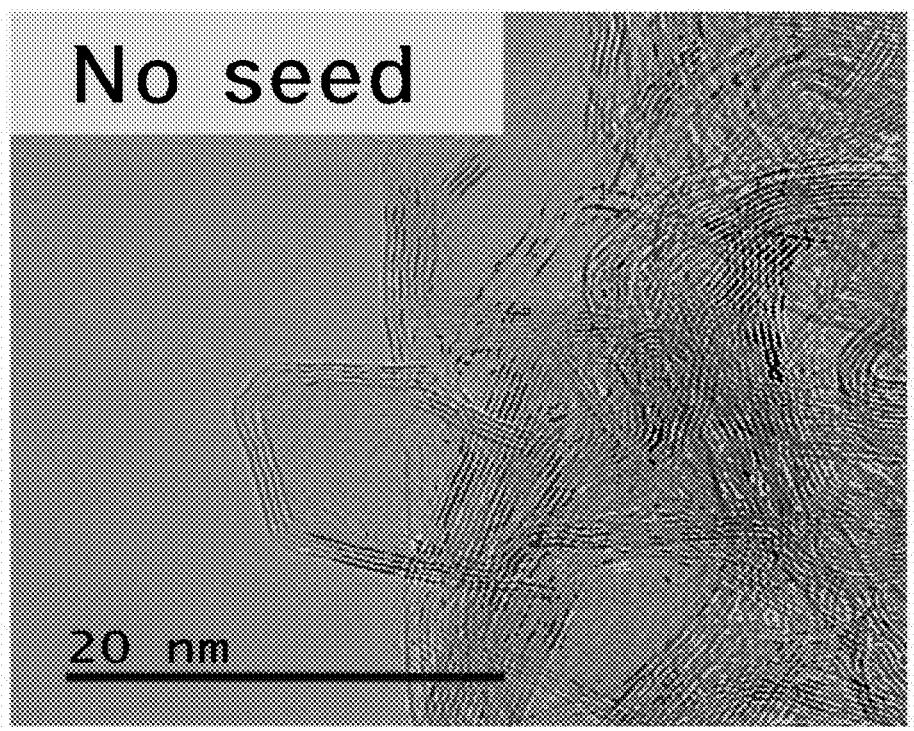
FIG. 19 is a TEM photograph showing the section of the seed layer on the carbon positive electrode after a lithium air battery manufactured according to Comparative Example 1 is charged and discharged five times.
Figure 20:
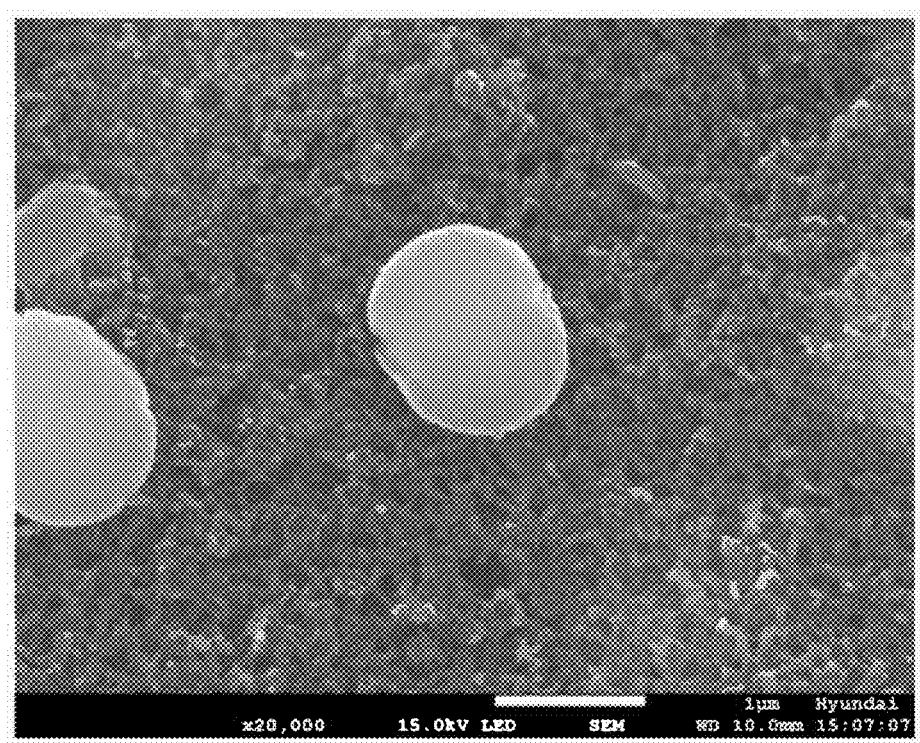
FIG. 20 is an SEM micrograph showing discharge products generated on the discharged carbon positive electrode after the lithium air battery manufactured according to Comparative Example 1 is charged and discharged five times.

FIG. 19 is a TEM photograph showing the section of the seed layer on the carbon positive electrode after the lithium air battery manufactured according to Comparative Example 1 is charged and discharged five times. FIG. 19 shows that no seed layer was formed on the surface of the carbon positive electrode even though charging and discharging were performed five times. FIG. 20 is an SEM micrograph showing discharge products generated on the discharged carbon positive electrode after the lithium air battery manufactured according to Comparative Example 1 is charged and discharged five times. FIG. 20 shows large-sized spherical discharge products formed on a portion of the surface of the seed layer.

Experimental Example 3: Evaluation of the Lifespan of the Lithium Air Battery

Initial charging and discharging of the lithium air batteries manufactured according to Example and Comparative Example 1 were performed five times. At this time, current was supplied to the lithium air batteries for 10 hours under conditions of a pressure of 2 bar, a current of 0.5 mA/cm2, and a cut-off voltage of 2.0 V in an oxygen atmosphere in order to perform each charging and discharging operation. Subsequently, charging and discharging were performed under conditions of the same pressure and voltage as the above and a high current of 1.5 mA/cm2.

In addition, the lithium air battery according to Comparative Example 2 was initially charged and discharged under conditions of the same pressure and voltage as the above and a high current of 1.5 mA/cm2. The results are shown in FIGS. 21 to 23.

Figure 21:
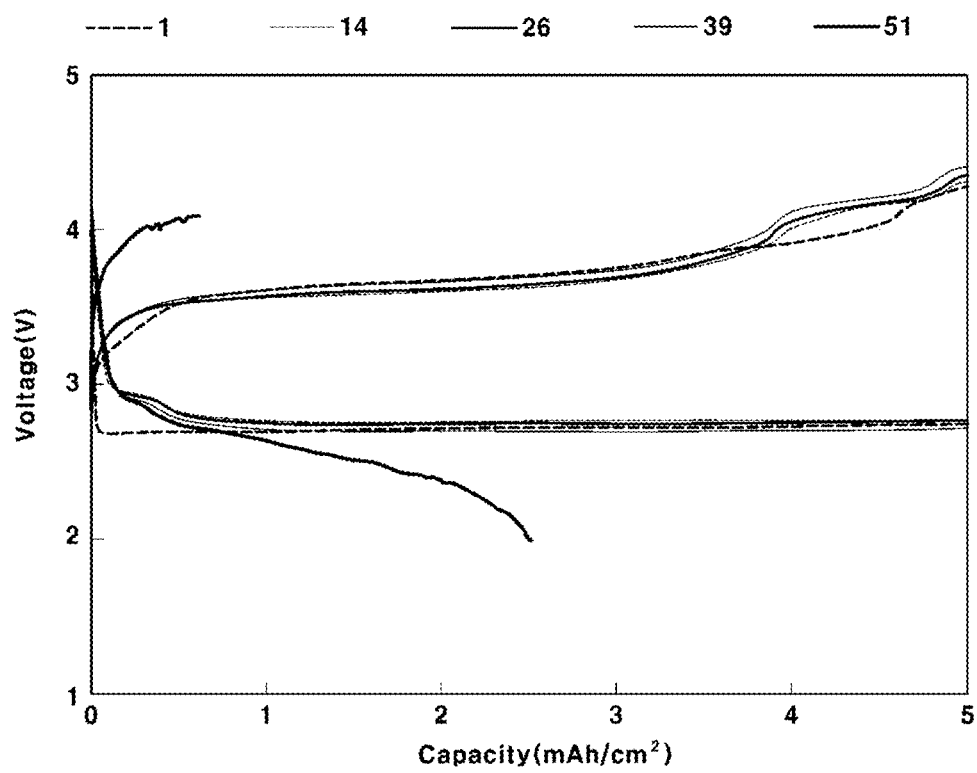
FIG. 21 is a graph showing charging and discharging of the lithium air battery manufactured according to Example.

FIG. 21 is a graph showing charging and discharging of the lithium air battery manufactured according to Example. Referring to FIG. 21, it can be seen that charging and discharging were finished after the number of charging and discharging cycles was 51 and that thin-film type discharge products grew on the seed layer on the carbon positive electrode in the lithium air battery, whereby the lifespan of the battery was increased without causing overvoltage. In addition, it can be seen that, for the lithium air battery, the number of reaction regions in which lithium ions could react was increased due to the seed layer, whereby the battery had a capacity of 5 mAh/cm2, which is higher than the capacity of a conventional lithium air battery (3.5~4 mAh/cm2).

Figure 22:
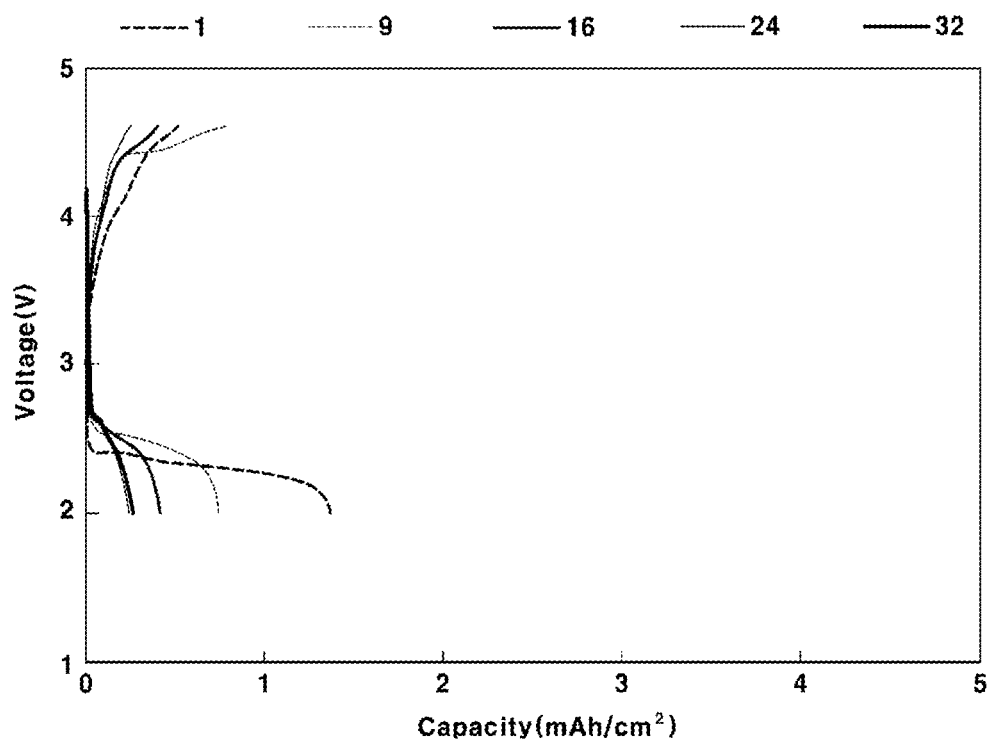
FIG. 22 is a graph showing charging and discharging of the lithium air battery manufactured according to Comparative Example 1.

FIG. 22 is a graph showing charging and discharging of the lithium air battery manufactured according to Comparative Example 1. In the case of Comparative Example 1, the electrolyte contained in the separator did not include C, O, or N, and thus no seed layer was formed on the carbon positive electrode. Referring to FIG. 22, it can be seen that spherical discharge products were formed on the carbon positive electrode having no seed layer thereon, whereby overvoltage is occurred. In addition, it can be seen that the electrolyte was decomposed when a high current was supplied, whereby a capacity of 5 mAh/cm2 (ORR) was not obtained, unlike the Example, and the lifespan of the battery was abruptly reduced.

Figure 23:
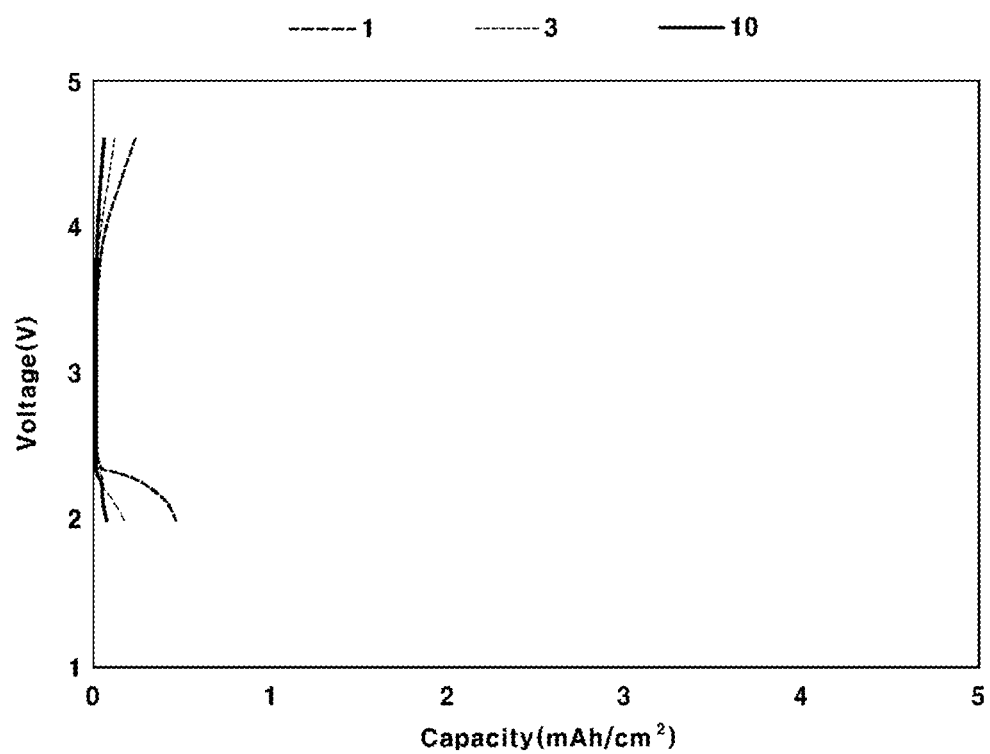
FIG. 23 is a graph showing charging and discharging of a lithium air battery manufactured according to Comparative Example 2.

FIG. 23 is a graph showing charging and discharging of a lithium air battery manufactured according to Comparative Example 2. Referring to FIG. 23, it can be seen that the process of forming the seed layer was not included in a low-current period of 0.1~0.9 mA/cm2, whereby not all reaction regions were activated when a high current was supplied, and therefore the capacity of the battery was abruptly reduced. As a result, it can be seen that ORR was impossible.

As apparent from the foregoing, a lithium air battery according to the present disclosure includes a seed layer formed between a carbon positive electrode and a separator. Consequently, the number of reaction regions that can react with lithium ions is increased, whereby high-speed discharging is possible, and the seed layer induces the growth of thin-film type discharge products, whereby high-speed charging is possible.

In the lithium air battery according to the present disclosure, the reaction of the seed layer formed on the carbon positive electrode is activated due to the electronegativity and lithium ion conductivity thereof to induce the growth of the thin-film type discharge products, whereby it is possible to increase the capacity of the battery.

In addition, in the lithium air battery according to the present disclosure, the thin-film type discharge products formed on the seed layer have a short electron movement distance, whereby overvoltage is reduced and thus the lifespan of the battery is increased. Accordingly, an electrolyte decomposition reaction is reduced, whereby the stability of the battery is improved.

The effects of the present disclosure are not limited to those mentioned above. It should be understood that the effects of the present disclosure include all effects that can be inferred from the foregoing description of the present disclosure.

While this present disclosure has been described in connection with what is presently considered to be practical exemplary forms, it is to be understood that the present disclosure is not limited to the disclosed forms, but, on the contrary, it is intended to cover various modification and equivalent arrangements included within the spirit and scope of the present disclosure.

What is claimed is:

1. A lithium air battery comprising:
   a carbon positive electrode;
   a seed layer formed on the carbon positive electrode;
   a separator formed on the seed layer;
   a lithium negative electrode formed on the separator; and
   an electrolyte impregnated in the separator, wherein:
      the seed layer comprises a non-metal element including lithium (Li), a lithium-based compound, or a mixture thereof, and
      the seed layer is configured to directly contact with the separator and the carbon positive electrode and configured to induce growth of thin-film type discharge products between the seed layer and the separator when the lithium air battery is repeatedly discharged and charged.

2. The lithium air battery according to claim 1, wherein the seed layer comprises at least one non-metal element selected from a group consisting of lithium (Li), carbon (C), oxygen (O), nitrogen (N), phosphorus (P), and sulfur (S), the lithium-based compound, to which at least one non-metal element selected from a group consisting of lithium (Li), carbon (C), oxygen (O), nitrogen (N), phosphorus (P), and sulfur (S) is coupled, or the mixture thereof.

3. The lithium air battery according to claim 2, wherein the lithium-based compound is at least one selected from a group consisting of $LiNO_3$, $LiNO_2$, $Li_2S_6$, $Li_3P$, $Li_3PO_4$, $Li_xPO_yN_z$ (where $3<x<4.5$, $1.5<y<3.5$, and $0.2<z<1.5$), $Li_2CO_3$ or mixtures thereof.

4. The lithium air battery according to claim 1, wherein the seed layer has a thickness of 1 to 100 nm.

5. The lithium air battery according to claim 1, wherein the seed layer exhibits lithium ion conductivity higher than electron conductivity.

6. The lithium air battery according to claim 1, wherein the thin-film type discharge products are at least one lithium oxide selected from a group consisting of $Li_2O_2$, $LiO_2$, and LiOH.

7. A manufacturing method of a lithium air battery having a separator, a lithium negative electrode and an electrolyte, the manufacturing method comprising the steps of:
   mixing a carbon positive electrode with a composition for seed formation;
   forming a seed layer on the carbon positive electrode;
   manufacturing the lithium air battery comprising the carbon positive electrode having the seed layer thereon, the lithium negative electrode, the separator disposed between the seed layer and the lithium negative electrode, and the electrolyte impregnated in the separator;
   arranging the seed layer to form a direct contact with the separator and the carbon positive electrode; and repeatedly discharging and charging the lithium air battery to induce growth of thin-film type discharge products between the seed layer and the separator,
wherein the seed layer comprises a non-metal element including lithium (Li), a lithium-based compound, or a mixture thereof.

8. The manufacturing method according to claim 7, wherein the composition for seed formation comprises the lithium-based compound and an organic solvent.

9. The manufacturing method according to claim 8, wherein the composition for seed formation comprises the lithium-based compound having a concentration of 0.1 to 5M.

10. The manufacturing method according to claim 8, wherein the organic solvent is at least one selected from a group consisting of dimethylacetamide (DMAc), N-methylformamide, N-methylpyrrolidone, and diethylacetamide.

11. The manufacturing method according to claim 7, wherein the seed layer comprises at least one non-metal element selected from a group consisting of lithium (Li), carbon (C), oxygen (O), nitrogen (N), phosphorus (P), and sulfur (S), the lithium-based compound, to which at least one non-metal element selected from a group consisting of lithium (Li), carbon (C), oxygen (O), nitrogen (N), phosphorus (P), and sulfur (S) is coupled, or the mixture thereof.

12. The manufacturing method according to claim 11, wherein the lithium-based compound is at least one selected from a group consisting of $LiNO_3$, $LiNO_2$, $Li_2S_6$, $Li_3P$, $Li_3PO_4$, $Li_xPO_yN_z$ (where $3<x<4.5$, $1.5<y<3.5$, and $0.2<z<1.5$), $Li_2CO_3$ or mixtures thereof.

13. The manufacturing method according to claim 7, where in the step of forming the seed layer comprises supplying current to the composition for seed formation, with which the carbon positive electrode is mixed, for 10 minutes to 10 hours under conditions of a pressure of 1 to 3 bar, a current of 0.1 to 0.9 mA/cm$^2$, and a voltage of 2.0 to 4.6 V in order to perform electrolysis.

14. The manufacturing method according to claim 7, wherein the step of inducing the growth of the thin-film type discharge products comprises primary charging and discharging the lithium air battery for three to five times, and secondary charging and discharging the lithium air battery, which has been primarily charged and discharged.

15. The manufacturing method according to claim 14, wherein the primary charging and discharging step comprises supplying current to the lithium air battery for 10 minutes to 10 hours under conditions of a pressure of 1 to 3 bar, a current of 0.1 to 0.9 mA/cm$^2$, and a voltage of 2.0 to 4.6 V in an oxygen or air atmosphere in order to perform each charging and discharging operation.

16. The manufacturing method according to claim 14, wherein the secondary charging and discharging step comprises supplying current to the lithium air battery for 10 minutes to 10 hours under conditions of a pressure of 1 to 3 bar, a current of 0.1 to 3.0 mA/cm$^2$, and a voltage of 2.0 to 4.6 V in an oxygen or air atmosphere in order to perform each charging and discharging operation.

17. The manufacturing method according to claim 8, wherein the thin-film type discharge products are at least one lithium oxide selected from a group consisting of $Li_2O_2$, $LiO_2$, and $LiOH$.

* * * * *